(12) United States Patent
Otsuka et al.

(10) Patent No.: US 8,745,927 B2
(45) Date of Patent: Jun. 10, 2014

(54) WEATHERSTRIP ATTACHABLE TO EDGE OF OPENING PORTION IN VEHICLE BODY

(71) Applicant: Toyoda Gosei Co., Ltd., Kiyosu (JP)

(72) Inventors: Hirofumi Otsuka, Kiyosu (JP); Masatoshi Hotta, Kiyosu (JP)

(73) Assignee: Toyoda Gosei Co., Ltd., Kiyosu-Shi, Aichi-Ken (JP)

( * ) Notice: Subject to any disclaimer, the term of this patent is extended or adjusted under 35 U.S.C. 154(b) by 0 days.

(21) Appl. No.: 13/623,736

(22) Filed: Sep. 20, 2012

(65) Prior Publication Data

US 2013/0067821 A1 Mar. 21, 2013

(30) Foreign Application Priority Data

Sep. 21, 2011 (JP) ................................. 2011-205649

(51) Int. Cl.
*E06B 7/16* (2006.01)

(52) U.S. Cl.
USPC .......................................................... 49/490.1

(58) Field of Classification Search
USPC .................... 49/475.1, 490.1, 498.1, 495.1
See application file for complete search history.

(56) References Cited

U.S. PATENT DOCUMENTS

| | | | | |
|---|---|---|---|---|
| 4,232,081 A | * | 11/1980 | Pullan | 428/217 |
| 4,461,507 A | * | 7/1984 | Minami et al. | 296/76 |
| 4,970,102 A | * | 11/1990 | Guillon | 428/122 |
| 5,072,546 A | * | 12/1991 | Ogawa | 49/490.1 |
| 6,598,347 B2 | | 7/2003 | Hattori | |
| 6,837,005 B2 | * | 1/2005 | Arata et al. | 49/440 |
| 6,874,281 B2 | * | 4/2005 | Fujita et al. | 49/490.1 |
| 6,926,944 B2 | * | 8/2005 | Watanabe | 428/122 |
| 7,252,294 B2 | * | 8/2007 | Yamada et al. | 277/641 |
| 2004/0040215 A1 | * | 3/2004 | Fujita et al. | 49/490.1 |
| 2007/0000180 A1 | * | 1/2007 | Oba et al. | 49/498.1 |
| 2007/0024084 A1 | | 2/2007 | Oba et al. | |
| 2008/0148646 A1 | * | 6/2008 | Nozaki et al. | 49/490.1 |
| 2009/0266000 A1 | * | 10/2009 | Minoura et al. | 49/490.1 |
| 2010/0242392 A1 | * | 9/2010 | Otsuka et al. | 52/309.4 |
| 2011/0072729 A1 | * | 3/2011 | Otsuka et al. | 49/490.1 |

FOREIGN PATENT DOCUMENTS

| | | |
|---|---|---|
| JP | 50-149011 A | 11/1975 |
| JP | 2001-310686 A | 11/2001 |
| JP | 2002-274285 A | 9/2002 |
| JP | 2006-7942 A | 1/2006 |
| JP | 2007-152978 A | 6/2007 |

* cited by examiner

*Primary Examiner* — Katherine Mitchell
*Assistant Examiner* — Scott Denion
(74) *Attorney, Agent, or Firm* — McGinn IP Law Group, PLLC (57) ABSTRACT

A weatherstrip includes: a trim portion and a seal portion. The trim portion includes: a main body portion including a first and second side wall portions provided on a vehicle outer side and a vehicle inner side, respectively; a first and second holding lips extending from the first and second side wall portions, respectively; and a first extended wall portion extending from a distal end portion of the first side wall portion. In a trim portion attaching direction, a distal end portion of the first side wall portion is positioned at, or on the weatherstrip inner circumferential side of, a boundary portion between the trim portion and an inner circumferential surface of the seal portion, and a distal end portion of the second side wall portion is positioned on the weatherstrip inner circumferential side of a distal end portion of the first extended wall portion.

9 Claims, 4 Drawing Sheets

FIG. 4

WEATHERSTRIP ATTACHABLE TO EDGE OF OPENING PORTION IN VEHICLE BODY

BACKGROUND

1. Technical Field

The present invention relates a weatherstrip attachable to a circumferential edge of an opening portion formed in a vehicle body.

2. Background Art

In general, a weatherstrip (an opening trim) is provided around a circumferential edge of an opening portion formed in a body of a motor vehicle. The weatherstrip includes: a trim portion which has a substantially U-shaped cross section and which is attached to a flange portion provided along the circumferential edge of the opening portion; and a seal portion which extends from the trim portion and which has a hollow portion formed therein. When an opening and closing member (a door or the like) configured to open and close the opening portion is closed, the seal portion is pressed by a circumferential edge portion of the opening and closing member, thereby sealing a gap defined between the circumferential edge of the opening portion of the body and the opening and closing member.

Conventionally, a metallic insert is embedded in the trim portion, and when the weatherstrip is attached to the flange portion, the attached state is maintained by a strong fastening force of the insert.

In recent years, in order to reduce the weight of a weatherstrip, an insert from a trim portion (to attain an insertless structure) is omitted. However, since the fitting force on the flange portion is weakened only by simply making the trim portion insertless, for example, Patent Document 1 describes a means for bonding the trim portion and the flange portion together with a pressure sensitive adhesive double coated tape.

Patent Document 1: JP-A-2002-274285

SUMMARY

However, when the weatherstrip is attached to the flange portion by use of the pressure sensitive adhesive double coated tape, production cost associated with an increase in the number of components may be increased, and the number of assembling manhours associated with positioning of the pressure sensitive adhesive double coated tape and separating a protection tape therefrom may be also increased.

Further, when the weatherstrip including the insertless trim portion is curved to follow a corner portion of the opening portion in the vehicle body, in particular, a portion bent at an acute angle (a portion bent acutely at a smaller angle), a vehicle-outer side wall and a vehicle-inner side wall of the trim portion having the substantially U-shaped cross section may be deformed to incline inwardly such that distal end portions thereof approach each other.

The inclined deformation may deteriorate assembling performance by excessively narrowing the distance between both the side walls on an open side of the trim portion (i.e., the opening of the trim portion is closed), whereby it is difficult to insert the flange portion into the trim portion.

Further, when the weatherstrip is curved, wrinkles may be produced at the trim portion so as to make the trim portion wavy. Depending on situations, the cross sections of the seal portion and the trim portion are deformed to be distorted, which affects the sealing properties and attaching stability to the flange portion.

The invention has been made in view of the above circumstances, and an object thereof is to provide a weatherstrip which can suppress the increase in production cost and the number of assembling manhours while realizing a reduction in weight and which can further improve the sealing properties and the attaching stability thereof.

Hereinafter, aspects of the invention will be described. Non-limiting functions and advantages to the aspects will additionally be described.

A first aspect of the invention provides a weatherstrip includes: an insertless trim portion attachable to a flange portion which is provided along a circumferential edge of an opening portion of a vehicle body of a vehicle and which has a first side surface facing toward an outside of the vehicle and a second side surface facing toward an inside of the vehicle; and a seal portion which protrudes from the trim portion toward the outside of vehicle and has a hollow portion formed therein, and which is pressed by a circumferential edge portion of an opening and closing member configured to open and close the opening portion of the vehicle body when the opening and closing member is closed, wherein at least a part of the weatherstrip in a longitudinal direction is formed of an extruded portion formed through extrusion, and the weatherstrip is attached such that the extruded portion corresponds to at least one of corner portions of the opening portion, wherein the trim portion includes: a main body portion which includes a first side wall portion provided on a vehicle outer side, a second side wall portion provided on a vehicle inner side, and a connecting portion which connects the first side wall portion and the second side wall portion such that the main body portion has a substantially U-shape in cross section, and which is formed of a solid material or a fine foamed material; a second holding lip which extends from the second side wall portion toward the outside of the vehicle so as to be pressed by the second side surface of the flange portion when the trim portion is attached to the flange portion, and which is formed of a solid material or a fine foamed material; a first holding lip which extends from the first side wall portion toward the inside of the vehicle so as to be pressed by the first side surface of the flange portion when the trim portion is attached to the flange portion, and which is formed of a solid material or a fine foamed material; and a first extended wall portion which extends toward a weatherstrip outer circumferential side (an outer circumferential side of the opening portion) from a distal end portion of the first side wall portion, and which is formed of a sponge material, wherein the seal portion is formed of a sponge material, and includes: a first end portion on a weatherstrip inner circumferential side (an inner circumferential side of the opening portion), which is connected to the first side wall portion; and a second end portion on the weatherstrip outer circumferential side, which is connected to the first extended wall portion, wherein the distal end portion of the first side wall portion (a boundary portion between the first side wall portion and the first extended wall portion) is positioned at a same position as, or on the weatherstrip inner circumferential side of, a position of the second end portion of the seal portion which forms a boundary portion between the trim portion facing the hollow portion and an inner circumferential surface of the seal portion with respect to a trim portion attaching direction, and wherein a distal end portion of the second side wall portion is positioned on the weatherstrip inner circumferential side of a distal end portion of the first extended wall portion with respect to the trim portion attaching direction (an attaching direction of the trim portion to the flange portion).

According to the first aspect, the main body portion of the trim portion is formed of the solid material (for example, a relatively hard material having hardness of about 90 degrees when expressed in the international rubber hardness degrees (IRHD)), while the second holding lip and the first holding lip are formed of the solid material (for example, a softer material than the main body portion whose hardness is about 70 degrees in IRHD). In this way, since the rigidity of the main body portion and the holding lips is made relatively high, even with the insertless weatherstrip having reduced weight, the trim portion can reliably be held on the flange portion by the elastic force of the holding lips and the main body portion which are pressed by the flange portion. Further, as compared with a case where an attaching means such as a pressure sensitive adhesive double coated tape is separately provided on the trim portion in order to hold the trim portion on the flange portion, a reduction in cost can be realized. In addition, an improvement in fabrication workability can be realized by reducing the number of assembling manhours.

Additionally, in this aspect, the trim portion includes the first extended wall portion which extends from the distal end portion of the first side wall portion and which is formed of the sponge material, and the seal portion which is formed of the sponge material includes a first end portion connected the first side wall portion and a second end portion connected to the first extended wall portion. Namely, in the first side wall portion of the trim portion which supports the seal portion, the portion on the weatherstrip outer circumferential side subjected to the larger deformation load is formed of the flexible sponge material. As a result, the following properties of the weatherstrip are increased, whereby the generation of distortion or wrinkles at the seal portion and the trim portion is suppressed. Hence, the sealing properties and the attaching stability to the flange portion are increased.

Further, in this aspect, the distal end portion of the first side wall portion is positioned at a same position as, or on the weatherstrip inner circumferential side of, the position of the second end portion of the seal portion which forms the boundary portion between the trim portion facing the hollow portion and the inner circumferential surface of the seal portion with respect to the trim portion attaching direction. With this configuration, the extension length of the first side wall portion subjected to relatively less deformation load when the weatherstrip is curved can be made as short as possible, while ensuring a sufficient length for the extension length of the first extended wall portion provided on the weatherstrip outer circumferential side and subjected to relatively larger deformation load when the weatherstrip is curved. As a result, the above-described function and advantage can be increased.

If the solid material and the sponge material are laminated at the same portion in the trim portion attaching direction, when the weatherstrip is curved, the portion is not stretched uniformly, whereby distortion may be generated. According to this aspect, the occurrence of such a drawback can be suppressed.

In addition, in this aspect, the distal end portion of the second side wall portion is positioned on the weatherstrip inner circumferential side of the distal end portion of the first extended wall portion with respect to the trim portion attaching direction, whereby both the side wall portions formed of the solid material can be made as short as possible. This enables to reduce the amount in which both the side wall portions are deformed to incline inwardly of the main body portion when the weatherstrip is curved. As a result, it is possible to reduce the possibility of occurrence of such a drawback that the flange portion is made difficult to be inserted into the trim portion, thereby making it possible to suppress the reduction in assembling workability.

Further, in this aspect, the extruded portion is attached not only to a straight portion of the opening portion in the vehicle body but also to the corner portion. Consequently, as compared with a weatherstrip in which all the portions corresponding to the corner portions are made of molded portions, an increase in fabrication workability and also a reduction in cost can be realized.

A second aspect of the invention provides the weatherstrip according to the first aspect, wherein the distal end portion of the second side wall portion is positioned at, or on the weatherstrip outer circumferential side of, the distal end portion of the first side wall portion with respect to the trim portion attaching direction.

According to the second aspect, the extension length of the second side wall portion is longer than, i.e., likely to be deformed to incline than, the extension length of the first side wall portion. With this configuration, the deformation of the first side wall portion and hence the seal portion is suppressed, and the press contact force of the second holding lip extending from the second side wall portion with the flange portion is increased while suppressing the reduction in sealing properties. Consequently, it possible to realize an increase in attaching stability.

A third aspect of the invention provides the weatherstrip according to the first or second aspect, wherein a length of the first side wall portion in the trim portion attaching direction is equal to or smaller than two thirds of a length of a combination of the first side wall portion and the first extended wall portion.

According to the third aspect, the function and advantage of the first aspect can be enhanced. However, in order to ensure a predetermined holding force, it is preferable that the length of the first side wall portion in the trim portion attaching direction is one third to two thirds of a length of a combination of the first side wall portion and the first extended wall portion.

A fourth aspect of the invention provides the weatherstrip according to any one of the first to third aspects, further including: a second extended wall portion which extends toward the weatherstrip outer circumferential side from the distal end portion of the second side wall portion, and which is formed of a sponge material, wherein a distal end portion of the second extended wall portion is positioned on the weatherstrip inner circumferential side of the distal end portion of the first extended wall portion with respect to the trim portion attaching direction.

According to the fourth aspect, in addition to the first side wall portion of the trim portion, with respect to the second side wall portion of the trim portion, an increase in following properties at the weatherstrip outer circumferential side and the suppression of the occurrence of distortion and wrinkles can also be realized. In addition, the distal end portion of the second extended wall portion is positioned on the weatherstrip inner circumferential side of the distal end portion of the first extended wall portion with respect to the trim portion attaching direction, whereby the extension length of the second extended wall portion can be made as short as possible. Consequently, it possible to reduce an amount of material used, and cost can be reduced.

A fifth aspect provides the weatherstrip according to the fourth aspect, further including: a second auxiliary lip formed of a sponge material, which extends toward the outside of the vehicle from the second extended wall portion and which is pressed by the second side surface of the flange portion when the trim portion is attached to the flange portion; and a first auxiliary lip formed of a sponge material, which extends toward the inside of the vehicle from the first extended wall portion and which is pressed by the first side surface of the flange portion when the trim portion is attached to the flange portion.

According to the fifth aspect, by the second auxiliary lip and the first auxiliary lip are pressed by the flange portion, it is possible to suppress the occurrence of such a drawback that the second extended wall portion and the first extended wall portion are inclined excessively.

A sixth aspect of the invention provides the weatherstrip according to any one of the first to fifth aspects, wherein an angle formed by the first side wall portion or the second side wall portion and the connecting portion is in a range of 75 to 90 degrees at an inside of the main body portion in a state in which the trim portion is not attached to the flange portion.

According to the sixth aspect, the main body portion is configured not to be opened toward the open side of the trim portion as possible, the press contact force of the holding lips on the flange portion is enhanced. Consequently, it is possible to increase the attaching stability of the weatherstrip further.

DETAILED DESCRIPTION

Figure 1:
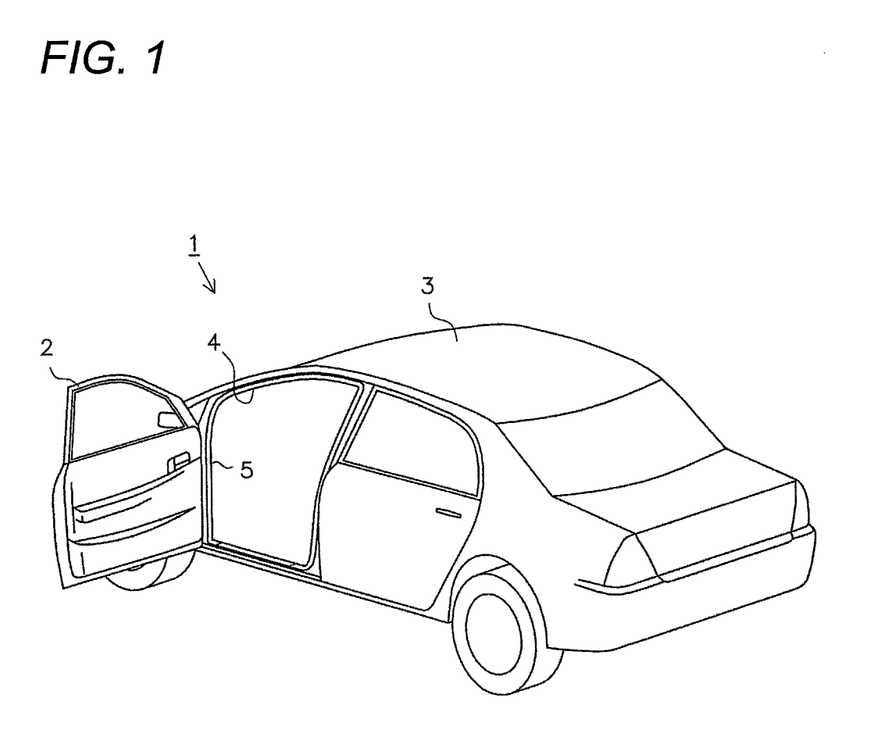
FIG. 1 is a perspective view of a motor vehicle in which a front side door is kept open.

Hereinafter, an embodiment will be described by reference to the drawings. As shown in FIG. 1, a door (a front side door in the figure, hereinafter referred to simply as a "door 2") serving as an opening and closing member is provided on a motor vehicle 1 serving as a vehicle so as to open and close the motor vehicle 1. In addition, a weatherstrip 5 is provided around a circumferential edge of a door opening portion 4 formed in a body 3 (a vehicle body) so as to correspond to the door 2.

In this embodiment, almost whole area or length of the weatherstrip 5 in a longitudinal direction is formed of an extruded portion which is formed through extrusion, and both ends thereof are connected together by a molded portion (not shown), whereby the weatherstrip 5 is formed into an annular shape as a whole.

Figure 2:
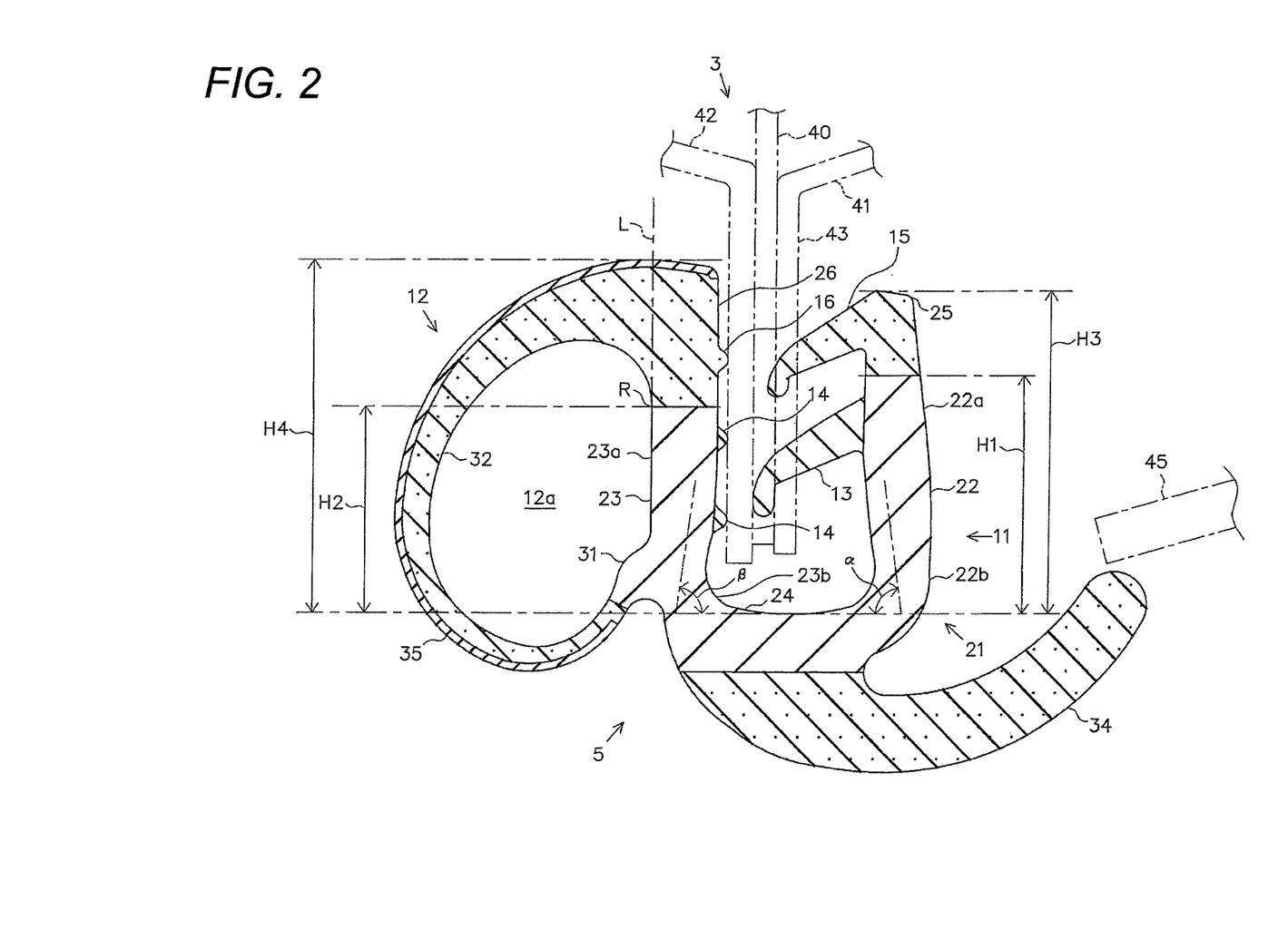
FIG. 2 is a cross-sectional view showing a weatherstrip.

As shown in FIG. 2, the weatherstrip 5 includes: a trim portion 11 which has a substantially U-shaped cross section and which is attachable to a flange portion 43 formed along a circumferential portion of the opening 4; and a seal portion 12 which is provided so as to protrude from the trim portion 11 toward a vehicle-outer side and which has a hollow portion 12a therein.

The trim portion 11 includes: a main body portion 21 which includes an inner side wall portion 22 (serving as an example of a second side wall portion) provided on a vehicle-inner side, an outer side wall portion 23 (serving as an example of a first side wall portion) provided on a vehicle-outer side, a connecting portion 24 which connects the side wall portions 22, 23 such that the main body portion 21 has a substantially U-shape in cross section; and an inner extended wall portion 25 (serving as an example of a second extended wall portion) provided on a vehicle-inner side and an outer extended wall portion 26 (serving as an example of a first extended wall portion) provided on a vehicle-outer side which are extended, respectively, from distal end portions of the inner side wall portion 22 and the outer side wall portion 23 toward a weatherstrip outer circumferential side (an outer circumferential side of the opening portion 4: upwards in FIG. 2) such that the extended wall portions 25, 26 extend from the side wall portions 22, 23, respectively.

The main body portion 21 is formed of a solid EPDM (ethylene propylene diene monomer rubber) having a hardness of 90 IRHD, and the inner extended wall portion 25 and the outer extended wall portion 26 are formed of a sponge EPDM having a specific weight of 0.6. In addition, the trim portion 11 of this embodiment is formed only of the solid EPDM and the sponge EPDM, and no insert is embedded (an insertless configuration).

In this embodiment, a vehicle-outer side surface of the inner side wall portion 22 and a vehicle-inner side surface of the outer side wall portion 23 are slightly curved, whereby thick portions 22a, 23a are formed at distal end portions of the inner side wall portion 22 and the outer side wall portion 23, respectively, while thin portions 22b, 23b are formed at portions of the inner side wall portion 22 and the outward side wall portion 23 which are located closer to the connecting portion 24 than the thick portions 22a, 23a, respectively. In the main body portion 21, an angle $\alpha$ is formed by the inner side wall portion 22 and the connecting portion 24, and an angle $\beta$ is formed by the outer side wall portion 23 and the connecting portion 24. The angles $\alpha$ and $\beta$ are set in the range of 75 degrees to 90 degrees (80 degrees in this embodiment) when the trim portion 11 is not attached to the flange portion 43. With this configuration, a distance between the inner side wall portion 22 and the outer side wall portion 23 is gradually reduced toward an open side of the trim portion 11, whereby the trim portion 11 is shaped so as to be slightly narrowed on the open side thereof.

The weatherstrip 5 includes: an inner holding lip 13 (serving as an example of a second holding lip) which extends from the vehicle-outer surface of the inner side wall portion 22 toward the vehicle-outer side and toward a weatherstrip inner circumferential side; and an outer holding lip 14 (serving as an example of a first holding lip) which extends from the vehicle-inner surface of the outer side wall portion 23 toward the vehicle-inner side.

Specifically, two outer holding lips 14 are provided on the outer side wall portion 23, and one inner holding lip 13 is provided on the inner side wall portion 22. One of the outer holding lips 14 is positioned at a portion in the vicinity of the distal end portion, and the other is positioned at a portion spaced in the weatherstrip inner circumferential side from the former portion with a predetermined distance. The inner holding lip 13 extends from a portion in the vicinity of the distal end portion of the inner side wall portion 22 (that is, the thick portion 22a) toward an area between the pair of outer holding lips 14. The inner holding lip 13 is larger than the outer holding lip 14, and almost the whole of the inner holding lip 13 is situated on the weatherstrip inner circumferential side of the distal end portion of the outer side wall portion 23 with respect to the trim portion attaching direction.

The inner holding lip 13 and the outer holding lips 14 of this embodiment are formed of a solid EPDM having a hardness of 70 IRHD.

The weatherstrip 5 includes: an inner auxiliary lip 15 which extends from a distal end portion of the inner extended wall portion 25 toward the vehicle-outer side and toward the weatherstrip inner circumferential side; and an outer auxiliary lip 16 which extends from a vehicle-inner side surface of the outboard extended wall portion 26 toward the vehicle-inner side. Similar to the inner extended wall portion 25 and the outer extended wall portion 26, the inner auxiliary lip 15 and the outer auxiliary lip 16 are formed of a sponge EPDM having a specific weight of 0.6.

The weatherstrip 5 includes: a cover lip 34 which extends toward the vehicle-inner side from a weatherstrip inner circumferential side of the connecting portion 24 (the inner circumferential side of the opening portion 4: a lower side in FIG. 2) so as to cover an end portion of an interior member 45 such as a garnish. The cover lip 34 is formed of a sponge EPDM having a specific weight of 0.6. a covering layer formed of a solid EPDM may be provided on a surface of the cover lip 34, similar to a seal wall portion 32 described later.

The relation in position and length between the elements of the trim portion 11 such as the side wall portions 22, 23 will be described in greater detail below. In this embodiment, the distal end portion of the inner side wall portion 22 is positioned on the weatherstrip outer circumferential side of the distal end portion of the outer side wall portion 23 with respect to the trim portion attaching direction. In other words, an extension length H1 of the inner side wall portion 22 is longer than an extension length H2 of the outer side wall portion 23.

In the embodiment, the "trim portion attaching direction" means a direction in which the trim portion 11 is attached to the flange portion 43, that is, a direction toward the weatherstrip outer circumferential side (the outer circumferential side of the opening portion 4: upper side in FIG. 2). Thus, the trim portion attaching direction is an opposite direction to an extending direction (lower side in FIG. 2) of the flange portion 43. The "extension lengths" of the portions such as the side wall portions 22, 23 mean distances extending along the trim portion attaching direction from the connecting portion 24 (a circumferentially innermost portion in a weatherstrip outer circumferential side surface of the connecting portion 24) to the respective distal end portions thereof.

In this embodiment, the distal end portion of the inner side wall portion 22 is positioned on the weatherstrip inner circumferential side of the distal end portion of the outer extended wall portion 26 with respect to the trim portion attaching direction. Further, the distal end portion of the inward extended wall portion 25 is positioned on the weatherstrip inner circumferential side of the distal end portion of the outer extended wall portion 26 with respect to the trim portion attaching direction. In other words, the extension length H1 of the inner side wall portion and an extension length H3 of a combination of the inner side wall portion 22 and the inner extended wall portion 25 (a whole inner side wall portion of the trim portion 11) are set shorter than an extension length H4 of a combination of the outer side wall portion 23 and the outer extended wall portion 26 (a whole outer side wall portion of the trim portion 11).

The extension length H2 of the outer side wall portion 23 is equal to or smaller than two thirds of the extension length H4 of the combination of the outer side wall portion 23 and the outer extended wall portion 26.

Figure 3:
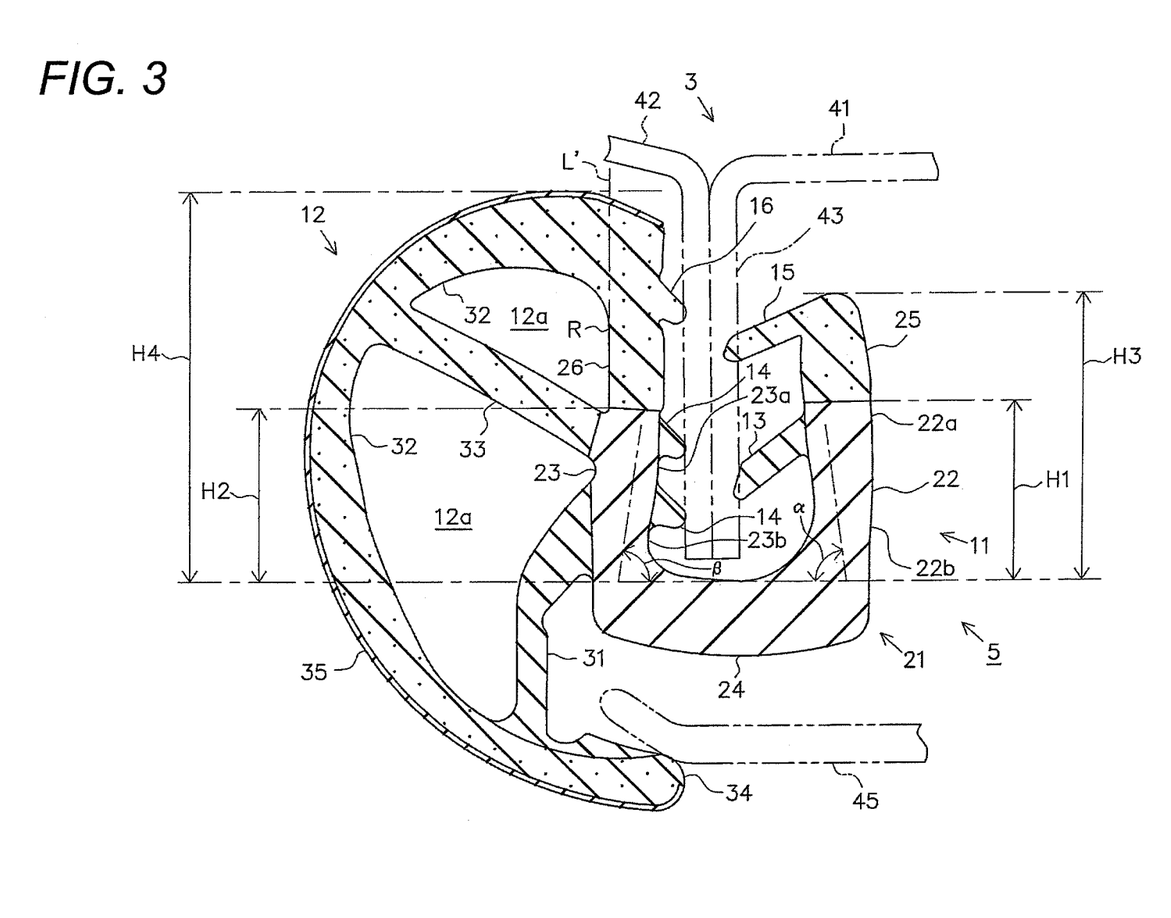
FIG. 3 is a cross-sectional view showing a weatherstrip according to another embodiment.

Next, the relation between the trim portion 11 and the flange portion 43 will be described in greater detail. The flange portion 43 is formed by joining an inner panel 41 and an outer panel 42 which make up the body 3. In this embodiment, there are two portions in the flange portion 43. One is a portion in which a reinforcement panel 40 is interposed between the inner panel 41 and the outer panel 42 (a portion in which the flange portion 43 is formed of three panel members) as shown in FIG. 2. The other is a portion in which the inner panel 41 and the outer panel 42 are joined directly (a portion in which the flange portion 43 is formed of two panel members) as shown in FIG. 3.

Then, by relatively fitting the flange portion 43 into the trim portion 11, the inner holding lip 13 and the inner auxiliary lip 15 are pressed by contacting an inner surface of the flange portion 43, and the outer holding lips 14 and the outer auxiliary lip 16 are pressed by contacting a vehicle-outer side surface of the flange portion 43. Consequently, the trim portion 11 is held on the flange portion 43, and the weatherstrip 5 is attached to the circumferential edge of the opening portion 4 of the body 3.

According to the configuration of this embodiment, the attached state of the weatherstrip 5 can be maintained only by the elastic force of the holding lips 13, 14 and the main body portion 21 which are pressed by contacting the flange portion 43. Further, by providing the auxiliary lips 15, 16 which are pressed by contacting the flange portion 43, it is possible to prevent the situation in which the trim portion 11 is inclined relative to the flange portion 43.

As described above, the thickness of the flange portion 43 varies at portions along the opening portion 4. However, the holding lips 13, 14 and the auxiliary lips 15, 16 are pressed by contacting the flange portion 43 while appropriately deflecting depending on the thicknesses of the flange portion 43. Consequently, the attached state of the weatherstrip 5 to the flange portion 43 can reliably be maintained along the full length of the weatherstrip 5.

By forming the holding lips 13, 14 of the solid EPDM having hardness of 70 IRHD which is softer than the main body portion 21, the holding lips 13, 14 can appropriately deflect depending on the thicknesses of the flange portion 43. Further, by forming the main body portion 21 of the relatively hard solid EPDM having hardness of 90 IRHD, the press contact force of the holding lips 13, 14 against the flange portion 43 is increased. Consequently, the attached state of the weatherstrip 5 can be stabilized further.

Next, the configuration of the seal portion 12 will be described in detail. A support wall portion 31 is formed on a vehicle-outer side surface of the outer side wall portion 23 so as to extend from a portion in the vicinity of a boundary portion between the outer side wall portion 23 and the connecting portion 24 toward the vehicle-outer side and toward the weatherstrip inner circumferential side. The support wall portion 31 is formed integrally with the main body portion 21 (the outer side wall portion 23).

In the seal portion 12, a seal wall portion 32 is formed to bent from the distal end portion of the outer extended wall portion 26 to a distal end portion of the support wall portion 31 such that the seal wall portion 32 protrudes in the vehicle-outer side. A weatherstrip inner circumferential side end portion (first end portion) of the seal wall portion 32 is connected to the outer side wall portion 23 (the support wall portion 31) and a weatherstrip outer circumferential side end portion (second end portion) thereof is connected to the outer extended wall portion 26.

In this embodiment, the distal end portion of the outer side wall portion 23 is positioned at the same position as a position as the weatherstrip outer circumferential side end portion of the seal wall portion 32 (seal portion 12) which forms a boundary portion (a curved end portion) R between the outer side wall portion 23 (the trim portion 11) facing the hollow portion 12a and an inner circumferential surface of the seal wall portion 32 with respect to the trim portion attaching direction.

Similar to the extended wall portions 25, 26, the seal wall portion 32 is formed of a sponge EPDM having a specific weight of 0.6. In addition, a covering layer 35 formed of a solid EPDM having a hardness of 70 IRHD is formed on surfaces of the seal wall portion 32 and the distal end portion of the outer extended wall portion 26.

When the door 2 is closed, the seal portion 12 (the seal wall portion 32) is pressed by contacting the circumferential edge portion of the door 2, whereby a gap defined between the door 2 and the body 3 is sealed.

In this embodiment, an unvulcanized solid EPDM and an unvulcanized sponge EPDM are extruded from an extruding machine (not shown) to extrude integrally a trim portion 11, a seal portion 12, holding lips 13, 14, auxiliary lips 15, 16, a cover lip 34 and covering layers 35, and the integrally extruded weatherstrip material is then subjected to a vulcanizing step, a cooling step and a cutting step. Then, ends of the weatherstrip materials which has been subjected to the cutting step are connected together through molding, whereby a weatherstrip 5 is fabricated finally.

Thus, as described in detail, according to the embodiment, the main body portion 21 of the trim portion 11 is formed of the solid EPDM having the hardness of 90 IRHD, and the holding lips 13, 14 are formed of the solid EPDM having the hardness of 70 IRHD. In this way, since the rigidities of the main body portion 21 and the holding lips 13, 14 are relatively high, even when the weight of the insertless weatherstrip 5 is reduced, the trim portion 11 can reliably be held on the flange portion 43 due to the elastic forces of the trim portion 11 and the holding lips 13, 14. Further, as compared with a case where an attaching means such as a pressure sensitive adhesive double coated tape is provided on the trim portion 11 in order to hold the trim portion 11 on the flange portion 43, cost can largely be reduced. In addition, as compared with the weatherstrip including the insert embedded in the trim portion, cost can be reduced.

In the embodiment, the trim portion 11 includes: the main body portion 21 which has the substantially U shaped in cross section and which is formed of the solid EPDM; and the extended wall portions 25, 26 which are formed of the sponge EPDM and which extend from the side wall portions 22, 23, respectively. Therefore, even when the weatherstrip 5 is curved so as to correspond to corner portions of the opening portion 4, the flange portion 43 can be inserted into the trim portion 11 relatively easily, and it is possible to suppress wrinkles generated in the trim portion 11. Consequently, the weatherstrip 5 can appropriately be attached to the circumferential edge of the opening portion 4 without forming molded portion corresponding to the corner portions of the opening portion 4. Thus, compared with a case where a weatherstrip is formed by connecting a plurality of extruded portions by molded portions, the fabricating performance can be increased, and the costs can be reduced.

In particular, in this embodiment, the trim portion 11 includes the outer extended wall portion 26 which is formed of the sponge EPDM and which extends from the distal end portion of the outer side wall portion 23. In addition, the seal portion 12 formed of the sponge EPDM is connected to the outer side wall portion 23 at the one end thereof and is connected to the outer extended wall portion 26 at the other end thereof. Namely, in the outer side wall portion of the trim portion 11 which supports the seal portion 12, the weatherstrip outer circumferential side portion subjected to more deformation load when the weatherstrip 5 is curved so as to correspond to the corner portions of the opening portion 4 of the motor vehicle 1 is formed of the sponge EPDM which is flexible. As a result, the following properties of the weatherstrip 5 are increased, whereby the generation of distortion and wrinkles in the seal portion 12 and the trim portion 11 is suppressed. Hence, the sealing properties and the attaching stability to the flange portion 43 of the weatherstrip 5 are enhanced.

Further, in this embodiment, the distal end portion of the outer side wall portion 23 is positioned at the same position as the position of the weatherstrip outer circumferential side end portion of the seal portion 12 which forms the boundary portion R between the outer side wall portion 23 facing the hollow portion 12a and the inner circumferential surface of the seal portion 12 with respect to the trim portion attaching direction. The boundary portion R exists on a boundary line L which is a boundary line between the outer extended wall portion 26 and the seal portion 12. The boundary line L is a line which extends along a straight portion of a vehicle-outer side external shape of the outer side wall portion 23. In another embodiment shown in FIG. 3, a distal end portion of an outer side wall portion 23 is positioned on a weatherstrip inner circumferential side (on a connecting portion 24 side) of a position which forms a boundary portion R. A boundary line L' in this embodiment is a line which extends along a straight portion of a vehicle-outer side external shape of an outer extended wall portion 26.

Figure 4:
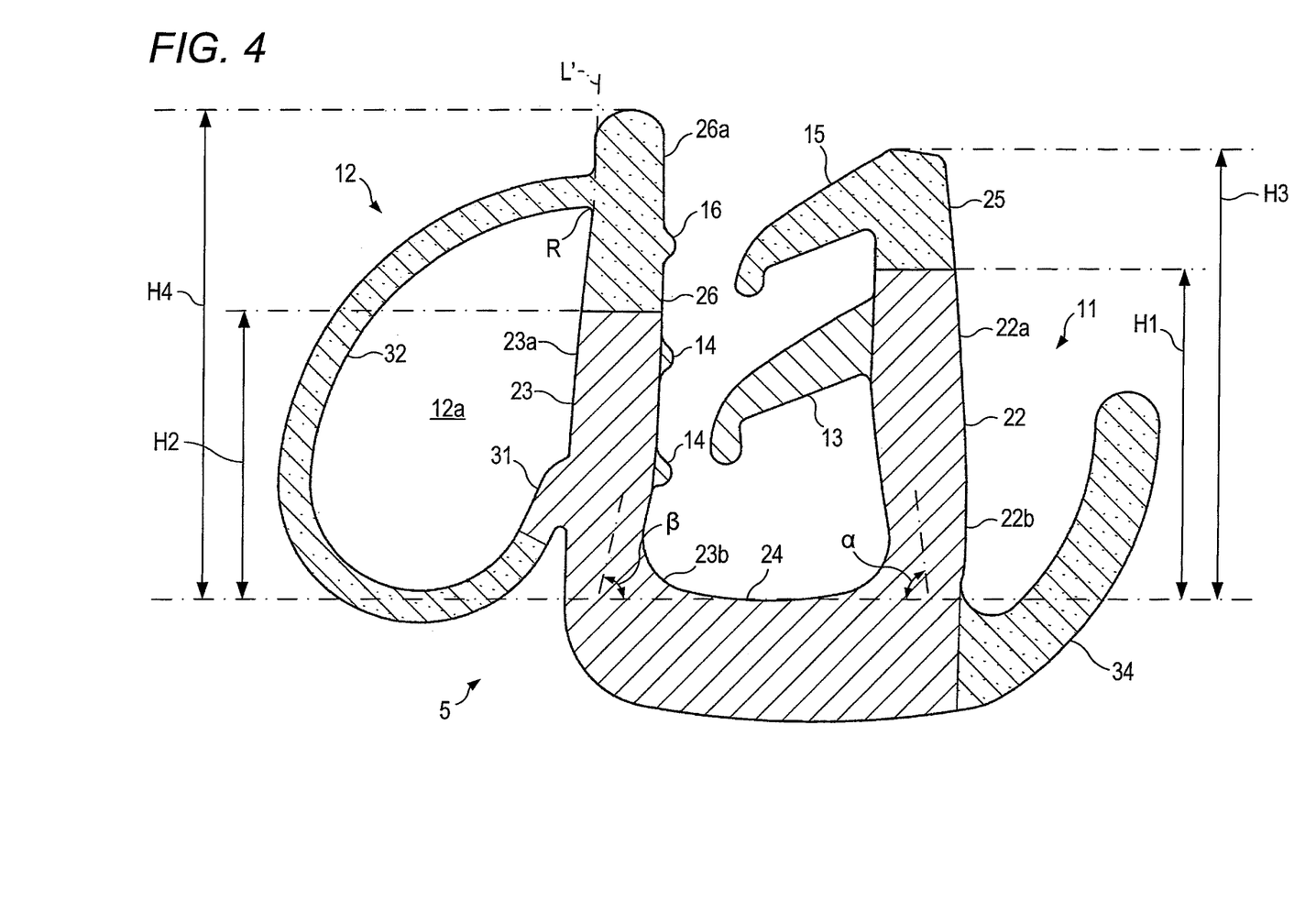
FIG. 4 is a cross-sectional view showing a weatherstrip according to yet another embodiment.

In the embodiments shown in FIGS. 2 and 3, one end of the seal portion 12 is connected to the distal end portion of the outer extended wall portion 26. However, as shown in FIG. 4, the outer extended wall portion 26 may include a protruding portion 26a protruding from a connection portion with the end of the seal portion 12 in the weatherstrip outer circumferential side. The protruding portion 26a can absorb impact to the weatherstrip 5 which is generated when the protruding portion 26a contacts the flange portion 43. Further, the protruding portion 26a can prevent leakage of water from outside to inside of the vehicle. In FIG. 4, the same elements as those shown in FIGS. 2 and 3 are appended to the same reference symbols, and the explanation thereof is omitted. In the weatherstrip 5 shown in FIG. 4, the coating layer 35 may be provided on the seal wall portion 32 similar to the configuration shown in FIGS. 2 and 3.

In particular, in this embodiment, an extension length H2 of the outer side wall portion 23 is equal to or smaller than two thirds of an extension length H4 of the combination of the outer side wall portion 23 and the outer extended wall portion 26. Consequently, while ensuring a sufficient length for an extension length (H4-H2) of the outer extended side wall portion 26 situated on a weatherstrip outer circumferential side subjected to relatively more deformation load when a weatherstrip 5 is curved, the extension length H2 of the outer side wall portion 23 subjected to less deformation load when the weatherstrip 5 is curved can be made as short as possible. As a result, the above-described function and advantage can be enhanced.

If the solid EPDM and the sponge EPDM are laminated at the same portion in the trim portion attaching direction, when the weatherstrip 5 is curved, the portion is not stretched uniformly, whereby distortion may be generated. According to the embodiment, the occurrence of such a drawback can be suppressed.

In addition, in this embodiment, the distal end portion of the inner side wall portion 22 is positioned on the weatherstrip inner circumferential side of the distal end portion of the outer extended wall portion 26 with respect to the trim portion attaching direction, whereby both the side wall portions formed of the solid EPDM can be made as short as possible. This enables to reduce the amount in which both the side wall portions 22, 23 are deformed to incline inwardly of the main body portion 21 when the weatherstrip 5 is curved. As a result, it is possible to reduce the possibility of occurrence of such a drawback that the flange portion 43 is made difficult to be inserted into the trim portion 11, thereby making it possible to suppress the reduction in assembling workability.

Further, in this embodiment, the distal end portion of the inner side wall portion 22 is positioned on the outer circumferential side of the distal end portion of the outer side wall portion 23 with respect to the trim portion attaching direction, and the extension length H1 of the inner side wall portion 22 is longer than the extension length H2 of the outer side wall portion 23. With this configuration, the inner side wall portion 22 is deformed to incline more easily than the outer side wall portion 23. As a result, the deformation of the outer side wall portion 23 and the seal portion 12 is suppressed. Thus, while suppressing the reduction in sealing properties, the press contact force, against the flange portion 43, of the inner holding lip 13 extending from the inner side wall portion 22 is enhanced, whereby attaching stability can be increased.

Further, in this embodiment, the distal end portion of the inner side wall portion 22 is positioned on the weatherstrip inner circumferential side of the distal end portion of the outer extended wall portion 26 with respect to the trim portion attaching direction. Additionally, the distal end portion of the inner extended wall portion 25 is also positioned on the weatherstrip inner circumferential side of the distal end portion of the outer extended wall portion 26 with respect to the trim portion attaching direction. With this configuration, similar to the outer side wall portion of the trim portion 11, with respect to the inner side wall portion of the trim portion 11, the following properties on the weatherstrip outer circumferential side can be enhanced, and the generation of distortion and wrinkles can be suppressed. Additionally, an extension length (H3−H1) of the inner extended wall portion 25 can be made as short as possible. Consequently, the amount of material used can be reduced, whereby the cost can be reduced.

In addition, in this embodiment, in the main body portion 21, the angle α formed by the inner side wall portion 22 and the connecting portion 24 and the angle β formed by the outer side wall portion 23 and the connecting portion 24 are set in the range of 75 degrees to 90 degrees (80 degrees in the embodiment) when the trim portion 11 is not attached to the flange portion 43. In this way, the main body portion 21 is configured not to be opened toward the open side of the trim portion 11 as possible, the press contact force of the holding lips 13, 14 on the flange portion 43 is enhanced. Consequently, it is possible to enhance the attached state of the weatherstrip 5 to the flange portion 43 further.

The weatherstrip 5 includes: the inner auxiliary lip 15 extending from the inner extended wall portion 25 toward the vehicle-outer side; and the outer auxiliary lip 16 from the outer extended wall portion 26 toward the vehicle-inner side. When the auxiliary lips 15, 16 is pressed by contacting the flange portion 43, it is possible to suppress excessive inclination of the extended wall portions 25, 26.

In this embodiment, almost the whole area or length of the weatherstrip 5 in the longitudinal direction is formed of the extruded portion which is formed through extrusion, and this extruded portion is also attached to the corner portions of the opening portion 4 in the body 3. Therefore, as compared with the weatherstrip in which the portions corresponding to the corner portions of the opening portion 4 are made of molded portions, the fabrication workability can be enhanced, and the cost can also be reduced.

The invention is not limited to the embodiment described above, and may be implemented in the following modifications. It is matter of course, other application examples and modified examples not be described below may also be made.

(a) In the embodiment, while the weatherstrip 5 is provided around the circumferential edge of the opening portion 4 corresponding to the front side door 2, the invention may also be applied to weatherstrips pressed by contacting circumferential edge portions of other opening and closing members such as a rear side door, a tailgate, a luggage compartment door (a trunk lid), a roof door (a sliding roof panel), a sliding door, etc.

(b) While the weatherstrip 5 of the embodiment is formed into the annular shape by connecting both end portions of the extruded portion by the molded portion, any other configurations may be adopted, so long as the extruded portion is attached to at least one of the corner portions. For example, the invention may be applied to a weatherstrip made of only an extruded portion whose ends are left unconnected, a weatherstrip made of a plurality of extruded portions connected by molded portions, a weatherstrip made of an extruded portion and a molded portion is formed only at one end so as not to be connected to the other end but to cover the other end, etc.

(c) In the embodiment, while the weatherstrip 5 is formed of the EPDM, the weatherstrip 5 may be formed of other materials such as an olefin-based thermoplastic elastomer (TPO). Further, in the embodiments, while the main body portion 21 and the holding lips 13, 14 are formed of the solid material, but may be formed of a relatively rigid fine foamed material (for example, a material having a hardness of 90 IRHD). For a weatherstrip 5 having a portion which is attached in a state in which the opening of a trim portion 11 is oriented upwards, in order to stabilize the attached state, it is preferable that a main body portion 21 is formed of a solid material.

(d) The cross-sectional shape of the weatherstrip 5 is not limited to those illustrated in the embodiment. For example, as shown in FIG. 3, a bridge portion 33 may be provided within a hollow portion 12a so as to be connected to an outer side wall portion 23 and a seal wall portion 32. The bridge portion 33 can easily keep the cross-sectional shape of the seal wall portion 32 including one end connected an outer extended wall portion 26 formed of a sponge EPDM. Consequently, it is possible to enhance the sealing properties. In particular, by the bridge portion 33 extending from an outer side wall portion 23 formed of a solid EPDM, as compared with a configuration in which the bridge portion 33 extends from the outer extended wall portion 26 formed of the sponge EPDM, the shape holding effect of the seal wall portion 32 can be enhanced.

(e) In the embodiment, also on the inner side wall portion 22 of the trim portion 11, the inner extended wall portion 25 is provided to extend from the distal end portion of the inner side wall portion 22. However, the invention is not limited thereto, and the inner extended wall portion 25 may be omitted. However, by providing the inner extended wall portion 25 and the inner auxiliary lip 15, it is possible to suppress inclination of the trim portion 11 relative to the flange portion 43.

(f) In the embodiment, the distal end portion of the outer side wall portion 23 is positioned at the same position as the position of the weatherstrip outer circumferential side end portion of the seal portion 12 which forms the boundary portion R between the outer side wall portion 23 facing the hollow portion 12a and the inner circumferential surface of the seal portion 12 with respect to the trim portion attaching direction. Alternatively, as shown in FIGS. 3 and 4, the distal end portion of the outer side wall portion 23 may be positioned on the weatherstrip inner circumferential side of the position of the weatherstrip outer circumferential side end portion of the seal portion 12 which forms the boundary portion R between the outer side wall portion 23 facing the hollow portion 12a and the inner circumferential surface of the seal portion 12 with respect to the trim portion attaching direction.

(g) In the embodiment, the extension length H2 of the outer side wall portion 23 is equal to or smaller than two thirds of the extension length H4 of the combination of the outer side wall portion 23 and the outer extended wall portion 26. In addition to this, in order to ensure a predetermined holding force, the extension length H2 of the outer side wall portion 23 preferably set from one thirds to two thirds of the extension length H4 of the combination of the outer side wall portion 23 and the outer extended wall portion 26.

(h) In the embodiment, the distal end portion of the inner side wall portion 22 is positioned on the weatherstrip outer circumferential side of the distal end portion of the outer side wall portion 23 with respect to the trim portion attaching direction, and the extension length H1 of the inner side wall portion 22 is longer than the extension length H2 of the outer side wall portion 23. Alternatively, the distal end portion of the inner side wall portion 22 may be positioned at the same position as the distal end portion of the outer side wall portion 23 with respect to the trim portion attaching direction, and the extension length H1 of the inner side wall portion 22 may be the same as the extension length H2 of the outer side wall portion 23.

(i) In the embodiment, the distal end portion of the inner extended wall portion 25 is positioned on the weatherstrip inner circumferential side of the distal end portion of the outer extended wall portion 26 with respect to the trim portion attaching direction. The invention is not limited thereto, and the distal end portion of the inner extended wall portion 25 may be positioned on the weatherstrip outer circumferential side of the distal end portion of the outer extended wall portion 26 with respect to the trim portion attaching direction.

(j) In the embodiment, while two outer holding lips 14 are provided and one inner holding lip 13 is provided, the invention is not limited thereto. For example, the outer holding lips 14 and the outer auxiliary lip 16 may be omitted. Further, a plurality of inner holding lips 13 may be provided.

(k) In the embodiment, the weatherstrip 5 includes: the inner auxiliary lip 15 extending from the inner extended wall portion 25 toward the vehicle-outer side; and the outer auxiliary lip 16 extending from the outer extended wall portion 26 in the vehicle-inner side. The invention is not limited thereto. For example, the inner auxiliary lip 15 and the outer auxiliary lip 16 may be omitted depending on a situation, for example, where the extension lengths of the inner extended wall portion 25 and the outer extended wall portion 26 are relatively short.

(l) In the embodiment, in the main body portion 21, the angle α formed by the inner side wall portion 22 and the connecting portion 24 and the angle β formed by the outer side wall portion 23 and the connecting portion 24 are set to be 80 degrees when the trim portion 11 is not attached to the flange portion 43. These angles α, β are not limited thereto, and hence, different angles may be adopted. However, the main body portion 21 is preferably shaped so as not to be opened toward the open side of the trim portion 11 as possible. In order to enhance the press contact force of the holding lips 13, 14 on the flange portion 43 and to stabilize further the attached state of the weatherstrip 5 to the flange portion 43, the angles α, β are preferably in the range of 75 degrees to 90 degrees. Of course, the angles α, β may be set to different angles.

(m) In the embodiment, the covering layer 35 is formed on the surface of the seal wall portion 32. However, the covering layer may be omitted. Further, a covering layer similar to the covering layer 35 may be formed on the surface of the cover lip 34.

By providing the covering layer such as the covering layer 35, it is possible to prevent a reduction in the quality with respect to the external appearance due to the surfaces of the seal wall portion 32 and the cover lip 34 formed of the sponge EDPM exposed to the outside. Further, the covering layers can enhance the resistance to wear of the surfaces of the seal wall portion 32 and the cover lip 34.

The cover lip 34 may be omitted, or the cover lip 34 may extend not from the connecting portion 24 but from the seal wall portion 32 as shown in FIG. 3.

(n) In the embodiment, one end of the seal portion 12 is connected to the distal end portion of the outer extended wall portion 26. However, the present invention is not limited thereto, and as shown in FIG. 4, the outer extended wall portion 26 may include a protruding portion 26a protruding from a connection portion with the end of the seal portion 12 in the weatherstrip outer circumferential side. With this configuration, when the protruding portion 26a contacts the flange portion 43, the protruding portion 26a can absorb impact to the weatherstrip 5. Further, the protruding portion 26a can prevent leakage of water from outside to inside of the vehicle.

What is claimed is:

1. A weatherstrip, comprising:
an insertless trim portion attachable to a flange portion which is provided along a circumferential edge of an opening portion of a vehicle body of a vehicle and which includes a first side surface facing toward an outside of the vehicle and a second side surface facing toward an inside of the vehicle; and
a seal portion which protrudes from the trim portion toward the outside of vehicle and includes a hollow portion formed therein, and which is pressed by a circumferential edge portion of an opening and closing member configured to open and close the opening portion of the vehicle body when the opening and closing member is closed,
wherein at least a part of said weatherstrip in a longitudinal direction comprises an extruded portion formed through extrusion, and the weatherstrip is attached such that the extruded portion attaches to at least one of a plurality of corner portions of the opening portion,
wherein the trim portion comprises:
a main body portion which comprises a first side wall portion provided on a vehicle outer side, a second side wall portion provided on a vehicle inner side, and a connecting portion which connects the first side wall portion and the second side wall portion such that the main body portion has a substantially U-shape in a cross section, and which comprises a solid material or a foamed material;
a holding lip which extends from the second side wall portion toward the outside of the vehicle so as to be pressed by the second side surface of the flange portion when the trim portion is attached to the flange portion, and which comprises a solid material or a foamed material;
another holding lip which extends from the first side wall portion toward the inside of the vehicle so as to be pressed by the first side surface of the flange portion when the trim portion is attached to the flange portion, and which comprises a solid material or a foamed material; and a first extended wall portion which extends toward a weatherstrip outer circumferential side from a distal end portion of the first side wall portion, and which comprises a sponge material,
wherein the seal portion includes a sponge material, and comprises:
a first end portion on a weatherstrip inner circumferential side, which is connected to the first side wall portion; and
a second end portion on the weatherstrip outer circumferential side, which is connected to the first extended wall portion,
wherein the distal end portion of the first side wall portion is positioned at a same position as, or on the weatherstrip inner circumferential side of, a position of the second end portion of the seal portion which forms a boundary portion between the trim portion that faces the hollow portion and an inner circumferential surface of the seal portion with respect to a trim portion attaching direction,
wherein a distal end portion of the second side wall portion is positioned on the weatherstrip inner circumferential side of a distal end portion of the first extended wall portion with respect to the trim portion attaching direction,
wherein the weatherstrip further comprises a second extended wall portion which extends toward the weatherstrip outer circumferential side from a distal edge of the distal end portion of the second side wall portion substantially along an extending direction of the second side wall portion, and which includes a sponge material, and
wherein a distal end portion of the second extended wall portion is positioned on the weatherstrip inner circumferential side of the distal end portion of the first extended wall portion with respect to the trim portion attaching direction.

2. The weatherstrip according to claim 1, wherein the distal end portion of the second side wall portion is positioned at, or on the weatherstrip outer circumferential side of, the distal end portion of the first side wall portion with respect to the trim portion attaching direction.

3. The weatherstrip according to claim 1, wherein a length of the first side wall portion in the trim portion attaching direction is equal to or smaller than two thirds of a length of a combination of the first side wall portion and the first extended wall portion.

4. The weatherstrip according to claim 1, further comprising:
an auxiliary lip comprising a sponge material, which extends toward the outside of the vehicle from the second extended wall portion and which is pressed by the second side surface of the flange portion when the trim portion is attached to the flange portion; and
another auxiliary lip comprising a sponge material, which extends toward the inside of the vehicle from the first extended wall portion and which is pressed by the first side surface of the flange portion when the trim portion is attached to the flange portion.

5. The weatherstrip according to claim 1, wherein an angle formed by the first side wall portion or the second side wall portion and the connecting portion is in a range from 75 degrees to 90 degrees at an inside of the main body portion in a state in which the trim portion is not attached to the flange portion.

6. The weatherstrip according to claim 1, wherein the second extended wall portion is provided on the vehicle inner side.

7. The weatherstrip according to claim 1, wherein a length of the second side wall portion is less than a length of a combination of the first side wall portion and the first extended wall portion.

8. The weatherstrip according to claim 1, wherein a length of a combination of the second side wall portion and the second extended wall portion is less than a length of a combination of the first side wall portion and the first extended wall portion.

9. The weatherstrip according to claim 1, wherein a length of an entirety of an inner side wall portion of the trim portion is more than a length of an entirety of an outer side wall portion of the trim portion.

* * * * *